United States Patent

Garg et al.

[11] Patent Number: 6,161,152
[45] Date of Patent: Dec. 12, 2000

[54] SYSTEM FOR PROVIDING ASYNCHRONOUS I/O OPERATIONS BY IDENTIFYING AND POLLING A PORTAL FROM AN APPLICATION PROCESS USING A TABLE OF ENTRIES CORRESPONDING TO I/O OPERATIONS

[75] Inventors: Sharad K. Garg; David S. Scott; Brad R. Rullman, all of Portland, Oreg.

[73] Assignee: Intel Corporation, Santa Clara, Calif.

[21] Appl. No.: 09/090,961

[22] Filed: Jun. 4, 1998

[51] Int. Cl.[7] ............................. G06F 13/20; G06F 13/22
[52] U.S. Cl. ............................... 710/46; 710/36; 710/62; 710/72; 709/224
[58] Field of Search ............................... 710/1, 72, 8, 62, 710/46, 36; 709/224

[56] References Cited

U.S. PATENT DOCUMENTS

| | | | |
|---|---|---|---|
| 4,628,445 | 12/1986 | Buonomo et al. | 364/200 |
| 5,619,710 | 4/1997 | Travis, Jr. et al. | 395/800 |
| 5,689,697 | 11/1997 | Edwards et al. | 395/603 |
| 5,862,338 | 1/1999 | Walker et al. | 395/200.54 |
| 5,915,095 | 6/1999 | Miskowiec | 395/200.53 |
| 5,915,131 | 6/1999 | Knight et al. | 395/892 |

Primary Examiner—Thomas C. Lee
Assistant Examiner—Rehana Perveen
Attorney, Agent, or Firm—Blakely, Sokoloff, Taylor & Zafman LLP

[57] ABSTRACT

A method and apparatus for issuing a non-blocking system call to an I/O interface process, the non-blocking system call identifying a portal from an application process, and polling the portal to determine if an I/O request is complete, the I/O interface process: polling an I/O device in response to the non-blocking system call to determine if the I/O operation is complete; and indicating that the I/O operation is complete using the portal.

20 Claims, 6 Drawing Sheets

SYSTEM FOR PROVIDING ASYNCHRONOUS I/O OPERATIONS BY IDENTIFYING AND POLLING A PORTAL FROM AN APPLICATION PROCESS USING A TABLE OF ENTRIES CORRESPONDING TO I/O OPERATIONS

BACKGROUND OF THE INVENTION

1. Field of the Invention

The present invention relates to the field of massively parallel computer systems; more particularly, the present invention relates to a method and apparatus for using multiple input/output (I/O) proxy processes in a massively parallel computer.

2. Description of Related Art

Many scientific applications such as nuclear explosion simulation, seismic exploration, and weather forecasting require large quantities of processing power and are thus ideal for massively parallel processor (MPP) computers. MPP computers use a large number of processors—compute nodes—that are interconnected through a network to run one or more application processes and a large number of processors—service and input/output (I/O) nodes—to perform I/O services for the application processes.

A first operating system, such as the Cougar operating system, is run on the compute nodes and a second operating system, such as a version of the Open System Foundation (OSF/1) operating system, is run on the service nodes and the I/O nodes. The first operating system is typically a light-weight operating system optimized for performance, scalability, and availability in running the application processes. In order to make this operating system lightweight, the first operating system typically does not include any I/O capability. In contrast, the second operating system is typically a fully functional UNIX operating system capable of performing I/O services. I/O proxy processes run under the second operating system as a proxy for applications running under the first operating system. These I/O proxy processes provide I/O services to the applications.

The processing power of an MPP computer typically scales efficiently with the number of compute nodes. The volume of I/O requests typically increases as the number of compute nodes increases.

As the number of I/O requests increase, the ability of the I/O proxy processes to handle these I/O requests will eventually become saturated thus creating an I/O bottleneck. This bottleneck limits the ability of the I/O proxy processes to more completely utilize the bandwidth of the I/O hardware.

One type of I/O request issued by application processes is a blocking (synchronous) I/O request. When an I/O proxy process receives a blocking I/O request, it becomes unavailable to process subsequent I/O requests (it blocks) until the I/O operation associated with the blocking I/O request is completed. By making an I/O proxy process unavailable for periods of time, the ability of the I/O proxy process to more completely utilize the bandwidth of the I/O hardware is reduced.

What is needed is a method and apparatus to more completely exploit the bandwidth of I/O hardware in a massively parallel processor (MPP) computer.

SUMMARY OF THE INVENTION

A method and apparatus for issuing a non-blocking system call to an I/O interface process, the non-blocking system call identifying a portal from an application process, and polling the portal to determine if an I/O request is complete, the I/O interface process: polling an I/O device in response to the non-blocking system call to determine if the I/O operation is complete; and indicating that the I/O operation is complete using the portal.

DETAILED DESCRIPTION

Figure 1:
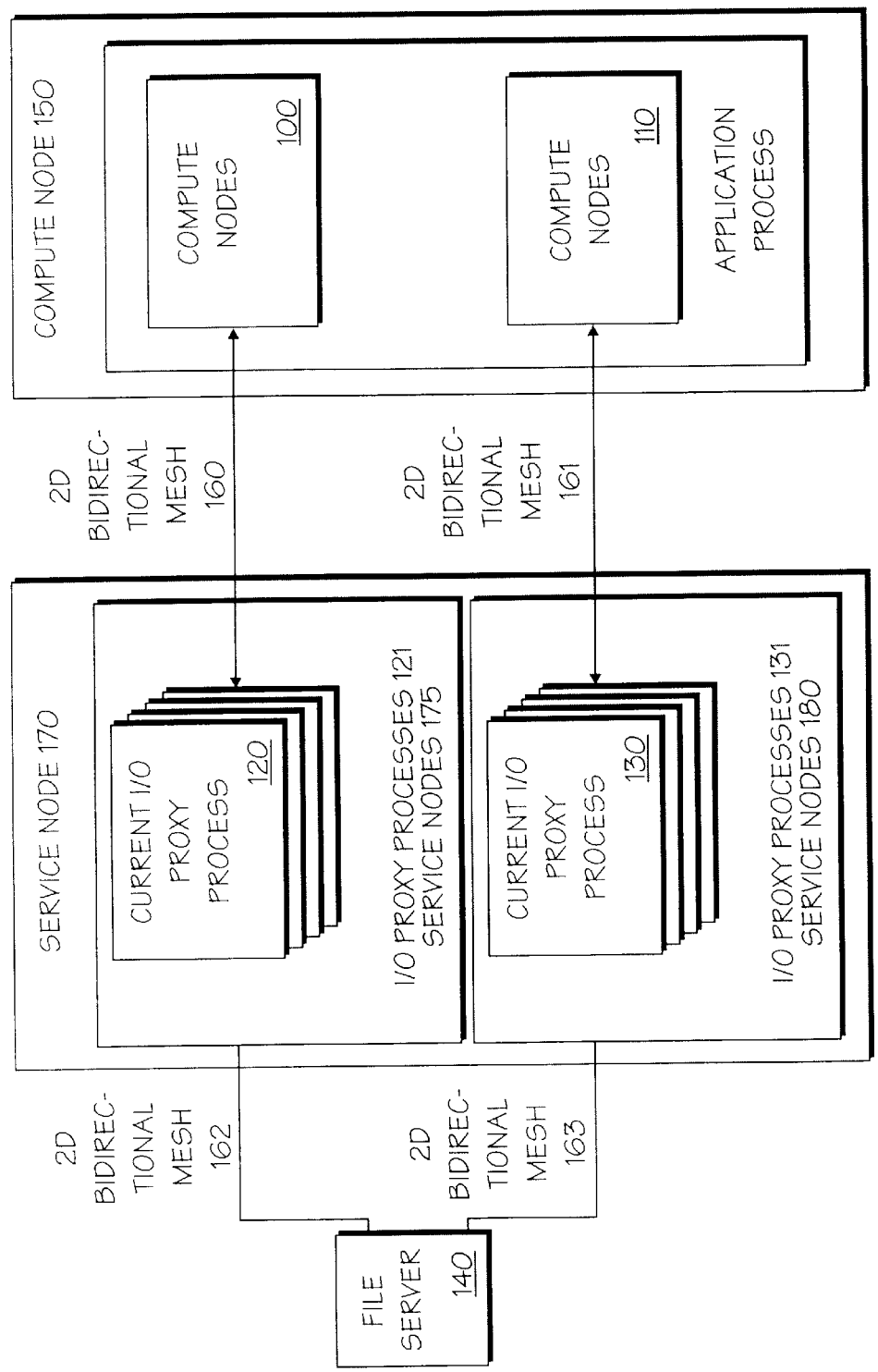
FIG. 1 illustrates one embodiment of a computer system of the present invention.

The present invention is a method and apparatus to more completely exploit the bandwidth of input/output (I/O) hardware in a massively parallel processor (MPP) computer.

In one embodiment, an MPP computer includes a set of compute nodes (running an application process and a library process), a set of service nodes (running one or more I/O proxy processes), and an I/O subsystem that includes a file server. Each I/O proxy process is used to process I/O calls received from one or more application processes through the corresponding library process. Each I/O proxy process interfaces with the I/O subsystem to process the I/O calls.

One aspect of the invention is a method and apparatus for dynamically creating I/O proxy processes (running on the service nodes) in response to certain events to more efficiently use computer resources. One event may be an I/O request to open a file when the current I/O proxy process does not have any available file descriptors. Another event may be a running application process starting to use a new set of compute nodes for which there are not any I/O proxy processes assigned. Yet another event may be a user-request to generate more I/O proxy processes. Other events may be used to trigger the dynamic creation of I/O proxy processes. By dynamically creating I/O proxy processes, the number of I/O proxy processes may be controlled to more completely exploit the bandwidth of the I/O hardware.

Another aspect of the invention is a method and apparatus for providing non-blocking (asynchronous) I/O calls to the I/O proxy processes. In one embodiment, a library process (running on the compute nodes) transparently translates a blocking (synchronous) I/O call from an application process (running on the compute nodes) to a non-blocking I/O call issued to an I/O proxy process (running on the service nodes). Since the I/O proxy process receives a non-blocking I/O call it is not blocked and is therefore available to process other I/O calls while waiting for the non-blocking I/O call to complete. By increasing the availability of the I/O proxy processes, the I/O proxy processes are able to more completely exploit the bandwidth of the I/O hardware.

In one embodiment, the non-blocking I/O call includes a portal. A portal includes a pointer to the address space of the issuing process (in this case the application process) so that information can be transferred directly to the issuing process. A portal key may be provided with the portal such that access through the portal is only provided to I/O requests that include the portal key. Alternatively, a portal key is not provided and all I/O requests may access the portal. In one embodiment, the portal is managed by the operating system in such a way that it is transparent to the issuing process.

By using a portal, the I/O proxy process can provide the status of the non-blocking I/O call to the library process through the portal when the I/O operation is completed rather than the library process (on a set of compute nodes) repeatedly issuing non-blocking I/O calls to the I/O proxy process (on the service nodes) to check the status of the I/O operation until the I/O operation is completed. By reducing the use of communication cycles between the set of compute nodes and the service nodes, more of the bandwidth of the I/O subsystem is made available for other I/O operations.

Although, each of these aspects of the invention may be practiced independently, one implementation employs both aspects of the invention.

FIG. 1 illustrates one embodiment of a computer system of the present invention. The computer system includes a set of compute nodes 150 including a set of compute nodes 100 and a set of compute nodes 110, a set of service nodes 170 including a set of service nodes 175 and a set of service nodes 180, and a file server 140. The set of service nodes 175 is coupled to the set of compute nodes 100 via a 2 dimensional (2D) bidirectional mesh 160 and coupled to the file server 140 via a 2D directional mesh 162. The set of service nodes 180 is coupled to the set of compute nodes 110 via a 2D directional mesh 161 and coupled to the file server 140 via a 2D directional mesh 163. In one embodiment, the 2D directional mesh 160, the 2D directional mesh 161, the 2D directional mesh 162 and the 2D directional mesh 163 are part of the same 2D bidirectional mesh interconnecting the compute nodes 150, the service nodes 170 and the I/O nodes (not shown). However, the present invention may be practiced with other interconnect configurations.

FIG. 1 illustrates an application process run on the set of compute nodes 150 and a set of I/O proxy processes 121 running on a set of service nodes 175 and a set of I/O proxy processes 131 running on a set of service nodes 180. The set of compute nodes 100 and the set of compute nodes 110 do not necessarily indicate a physical partition of the set of compute nodes 150. In one embodiment, the number of compute nodes and the particular compute nodes included in each of the sets of compute nodes is determined by software control.

When a compute node in the set of compute nodes 100 generates an I/O call, the I/O call is directed to one of the set of I/O proxy processes 121 through the 2D directional mesh 160. In one example, the I/O call is a request to open a file and the I/O call is directed to a current I/O proxy process 120 of the set of I/O proxy processes 121. In another example, the I/O call is a write or read operation to a particular file, the I/O call is directed towards the I/O proxy process that opened that particular file, the I/O proxy process being in the set of I/O proxy processes 121. The I/O proxy process that receives the I/O call issues a corresponding I/O call to an emulation library (not shown). An emulation library interprets I/O calls and interfaces with the file system to process these I/O calls. Here, the emulation library interacts with an I/O server 140 via the 2D directional mesh 162 to process the I/O call corresponding to the I/O request. In one embodiment, an emulation library is dynamically linked to each I/O proxy process. In one embodiment, a file server protocol, such as the parallel file system (PFS), is implemented in the emulation library.

When a compute node in the set of compute nodes 110 generates an I/O call, the I/O call is directed to one of the set of I/O proxy processes 131 through the 2D directional mesh 161. In one example, the I/O call is a request to open a file and the I/O call is directed to a current I/O proxy process 130 in the set of I/O proxy processes 131. In another example, the I/O call is a write or read operation to a particular file and the I/O call is directed towards the I/O proxy process that opened that particular file, the I/O proxy process being in the set of I/O proxy processes 131. The I/O proxy process that receives the I/O call issues a corresponding I/O call to an emulation library (not shown). The emulation library interacts with an I/O server 140 on the 2D directional mesh 163 to process the I/O request corresponding to the I/O call received by the emulation library.

If the number of compute nodes in the set of compute nodes 100 is increased for a fixed number of I/O proxy processes in the set of I/O proxy processes 121, the set of I/O proxy processes 121 may not be able to efficiently handle the volume of I/O calls generated by the set of compute nodes 100. In prior art computer systems, if the number of files opened by the set of compute nodes 100 reaches the limit of file descriptors for an I/O proxy process, subsequent requests to open files causes the I/O proxy process to close at least one of the open files to free a file descriptor. Opening and closing files increases the number of system calls and each of these system calls typically uses a context switch. The communication cycles associated with context switches degrades performance. In addition, a standard UNIX process has a limit of 64 file descriptors. This limits the number of open files that a single I/O proxy process in the set of I/O proxy processes 120 can manage for the compute nodes 100. It is not unusual for an I/O proxy process to service hundreds of compute nodes. A limit of 64 open files for 200 compute nodes, for example, can lead to performance degradation for the reasons described above.

The present invention provides for the dynamic creation of additional I/O proxy processes in a set of I/O proxy processes in response to an event. By allowing for the dynamic creation of I/O proxy processes when the number of open files is at the limit available to the running I/O proxy processes, the performance degradation associated with closing files to make file descriptors available is avoided. In one embodiment, an enhanced version of UNIX is used to provide more file descriptors so that more files may be opened by each I/O proxy process. In addition, the dynamic creation of I/O proxy processes when additional compute nodes are used by the application process allow I/O proxy processes to be adjusted in response to processing conditions.

Figure 2:
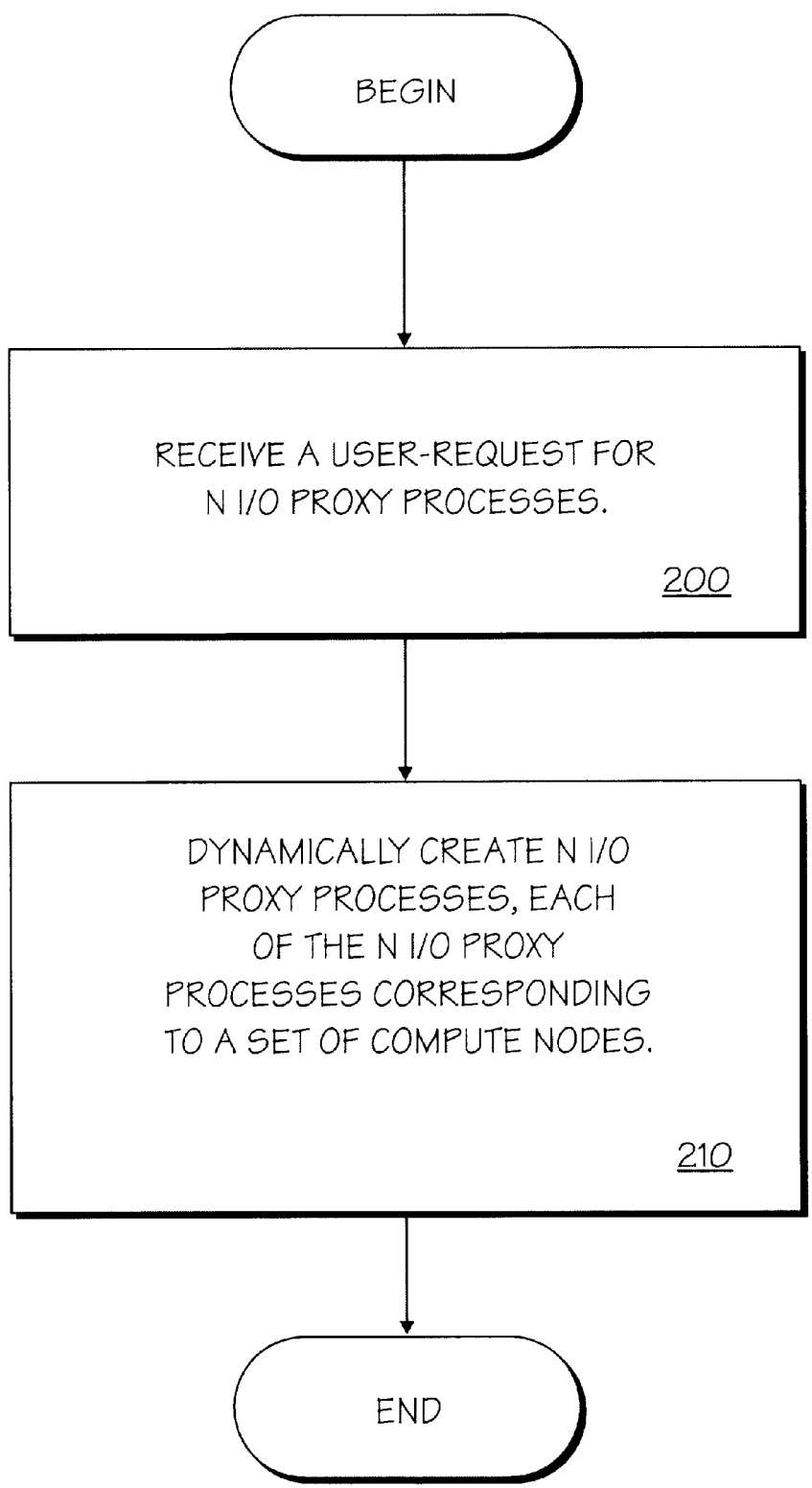
FIG. 2 illustrates one embodiment of the method of dynamically creating I/O proxy processes in response to selected events in the computer system of FIG. 1.

FIG. 2 illustrates one embodiment of the method of dynamically creating I/O proxy processes in response to selected events. The method is described with reference to FIG. 1. In this embodiment, the method is implemented using a control process.

In step 200, a control process receives a user-request to create N I/O proxy processes. For example, a user may request that 2 sets of I/O proxy processes are created when starting an application process. Alternatively, the user may request an additional two I/O proxy processes be created for an application process that is already running.

In step 210, a control process dynamically creates two sets of I/O proxy processes, each of the I/O proxy processes corresponding to a set of compute nodes. For example, if there are 256 compute nodes in the compute nodes 150, the set of I/O proxy processes 121 are assigned to the 128 compute nodes in the compute nodes 100 and the set of I/O proxy processes 131 are assigned to the 128 compute node in the compute nodes 110. Alternatively, the two sets of I/O proxy processes already have been created and an additional I/O proxy process is created for each set of I/O proxy process in response to a user-request that an additional two I/O proxy processes be created.

In another example, there are 256 compute nodes in the compute nodes 150 and the user requests four I/O proxy processes. Then each of the I/O proxy processes are assigned to the 64 compute nodes. Thus, I/O requests from compute nodes 0, 1, 2 . . . 63 are serviced through the first set of I/O proxy processes, I/O requests from compute nodes 64, 65, 66 . . . 127 are serviced through the second set of I/O proxy processes, etc.

In one embodiment, only a single I/O proxy process is initially created for each set of I/O proxy processes. Alternatively, two or more I/O proxy processes are initially created for each set of I/O proxy processes. In either case, additional I/O proxy processes may be dynamically created as described with reference to FIG. 3.

Figure 3:
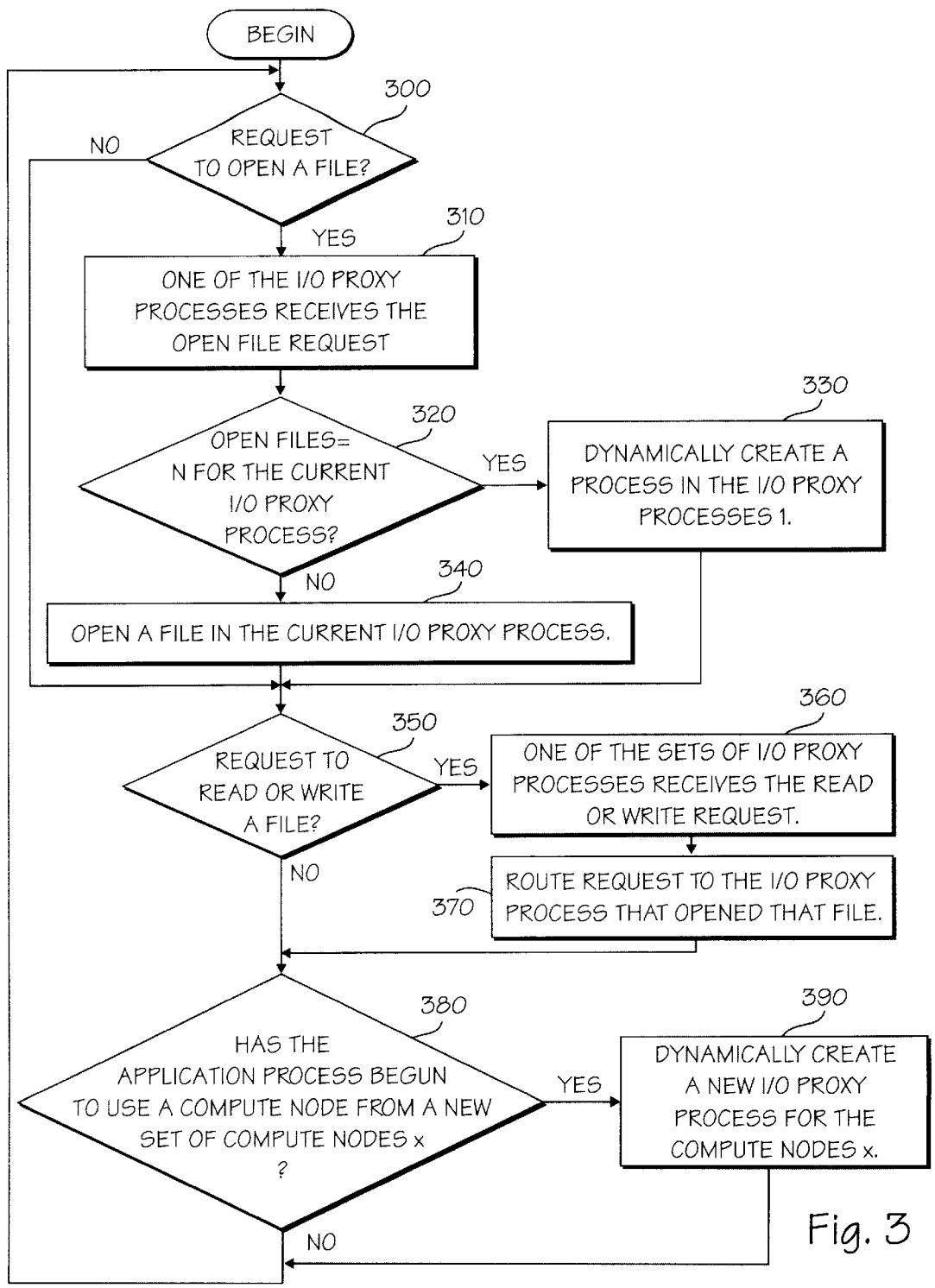
FIG. 3 illustrates another embodiment of the method of dynamically creating I/O proxy processes in response to selected events in the computer system of FIG. 1.

FIG. 3 illustrates another embodiment of the method of dynamically creating I/O proxy processes in response to selected events. The method is described with reference to FIG. 1. In one embodiment, the method is implemented using a control process.

In step 300, the control process determines whether a request to open a file has been made. If a request to open a file has been made, the control process performs step 310. Otherwise, the control process performs step 350.

In step 310, one of the sets of I/O proxy processes receives the open file request. Which of the multiple sets of I/O proxy processes receives the open file request depends on which of the sets of compute nodes the open file request is from. For example, in the configuration illustrated in FIG. 1, the set of I/O proxy processes 121 receives open file requests from the set of compute nodes 100 and the set of I/O proxy processes 131 receives open file requests from the set of compute nodes 110.

In step 320, for the set of I/O processes in which the open file request is directed, the control process determines whether the number of open files in the current I/O proxy process is equal to N where N is the open file limit of a process under that operating system. If the number of open files in the current I/O proxy process is equal to N, the control process performs step 330. Otherwise, the control process performs step 340. For example, if the control process had determined that the open file request had come from the set of compute nodes 110 in step 310, the control process would determine whether the number of open files in the current I/O proxy process 130 is equal to N.

In one embodiment, the operating system is a standard version of UNIX and N is 64. Alternatively, the operating system is an enhanced version of UNIX and N is 2048. In one embodiment, the number of open files available in the enhanced version of UNIX is achieved by providing 64 bit operands and an 11 bit file identification field in the 64 bit operand. Other implementations, such as those that use different size operands and file identification fields, may be used. Other values of N may be used.

In step 330, the control process dynamically creates a new I/O proxy process by cloning the current I/O proxy process for that set of compute nodes. For example, if the control process had determined that the number of open files in the current I/O proxy process 130 is equal to N, the control process clones the current I/O proxy process 130 to create a new I/O proxy process in the set of I/O proxy processes 131. The new I/O proxy process becomes the current I/O proxy process in the set of I/O proxy processes 131. Subsequent file open requests are now routed to the new I/O proxy process. Step 350 is performed.

In step 340, the control process opens a file in the current I/O proxy process. For example, if the control process had determined that the number of open files in the current I/O proxy process 130 is not equal to N, the control process would open a new file in the current I/O proxy process 130. Step 350 is performed.

In step 350, the control process determines whether a request to read or write to a file has been made. If a request to read or write to a file has been made, the control process performs step 360. Otherwise, the control process performs step 380.

In step 360, one of the sets of I/O proxy processes receives the read or write request. Which of the multiple sets of I/O proxy processes receives the read or write request depends on which of the sets of compute nodes the read or write request is from. For example, in the configuration illustrated in FIG. 1, the set of I/O proxy processes 121 receives read or write requests from the set of compute nodes 100 and the set of I/O proxy processes 131 receives read or write requests from the set of compute nodes 110.

In step 370, the I/O proxy process in the set of I/O proxy processes that opened the file to which the read or write is directed processes the read or write request. For example, in the configuration illustrated in FIG. 1, a first I/O proxy process of the set of I/O proxy processes 131 receives a read requests to a first file, if the first I/O proxy process had opened that first file. Step 380 is performed.

In step 380, the control process determines if the application process has begun to use a compute node from a set of compute nodes for which there is not a set of I/O proxy processes. If the application process has begun to use a node from a new set of compute nodes, the I/O proxy process performs step 390. Otherwise, the control process performs step 300.

In step 390, the control process dynamically creates a new I/O proxy process for the new set of compute nodes. Any file open requests and other I/O calls from this set of compute nodes are then processed by the current I/O proxy process for the set of I/O proxy processes 130.

Dynamically creating I/O proxy processes in response to certain events allows computer resources to be more efficiently used. In one embodiment, only one I/O proxy process is run on each service node. Alternatively, two or more I/O proxy processes are run on each service node. Generally, as the number of I/O proxy processes running on each node increases, the less computer resources is allocated to each I/O proxy process. In one embodiment, a round-robin method of distributing newly created I/O proxy processes on the set of service nodes may be used to equally distribute the load on the set of service nodes. However, other methods may distribute the newly created I/O proxy processes on the service nodes with consideration for other factors such as the relative load on each I/O proxy process and the performance of each particular service node in the set of service nodes.

In one embodiment, the computer system is a distributed memory, Multiple Instruction Multiple Data (MIMD) message passing machine having scalable communication bandwidth, scalable main memory, scalable internal disk storage capacity, and scalable I/O. One such computer is the Intel Teraflops (TFLOPS) Computer. One implementation includes 4,500 compute nodes each containing 2 Intel Pentium® Pro processors coupled together via 2D directional mesh interconnect having a bandwidth of 400 megabytes/second (MB/s), 32 service nodes, 40 I/O nodes coupled to 34 redundant arrays of inexpensive disks (RAIDS) each storing 32 gigabytes (GB), two 1 terabyte (TB) RAID storage systems, and 600 GB of main memory to derive 1.8 teraflops (peak) performance. The compute nodes run the Cougar operating system consisting of a Quintessential Kernel (Q-Kernel), a Process Control Thread (PCT), utilities such as yod and fyod. The service nodes and the I/O nodes run a version of the Open System Foundation (OSF/1) operating system.

In one embodiment, the control process is a yod and each I/O proxy process is an fyod. The yod is an OSF/1 utility that runs on one of the service nodes, and controls the application process on the compute nodes 150 including reading the application executable file, obtaining the compute nodes 150 to run the application, transmitting an application executable file to the compute nodes 150, and starts the execution of the application executable file on the compute nodes 150. All the UNIX system calls from the application process are directed to the yod. An fyod is an interface between the application process and the I/O subsystem. All the I/O requests from the application process are directed to an fyod. Some fyods may be started by the yod as a child process before it starts the application (statically). Other fyods may be started in response to certain events according to the method described above (dynamically).

It will be apparent to one skilled in the art that numerous computer hardware and software configurations may be used consistent with the spirit and scope of the present invention.

Figure 4:
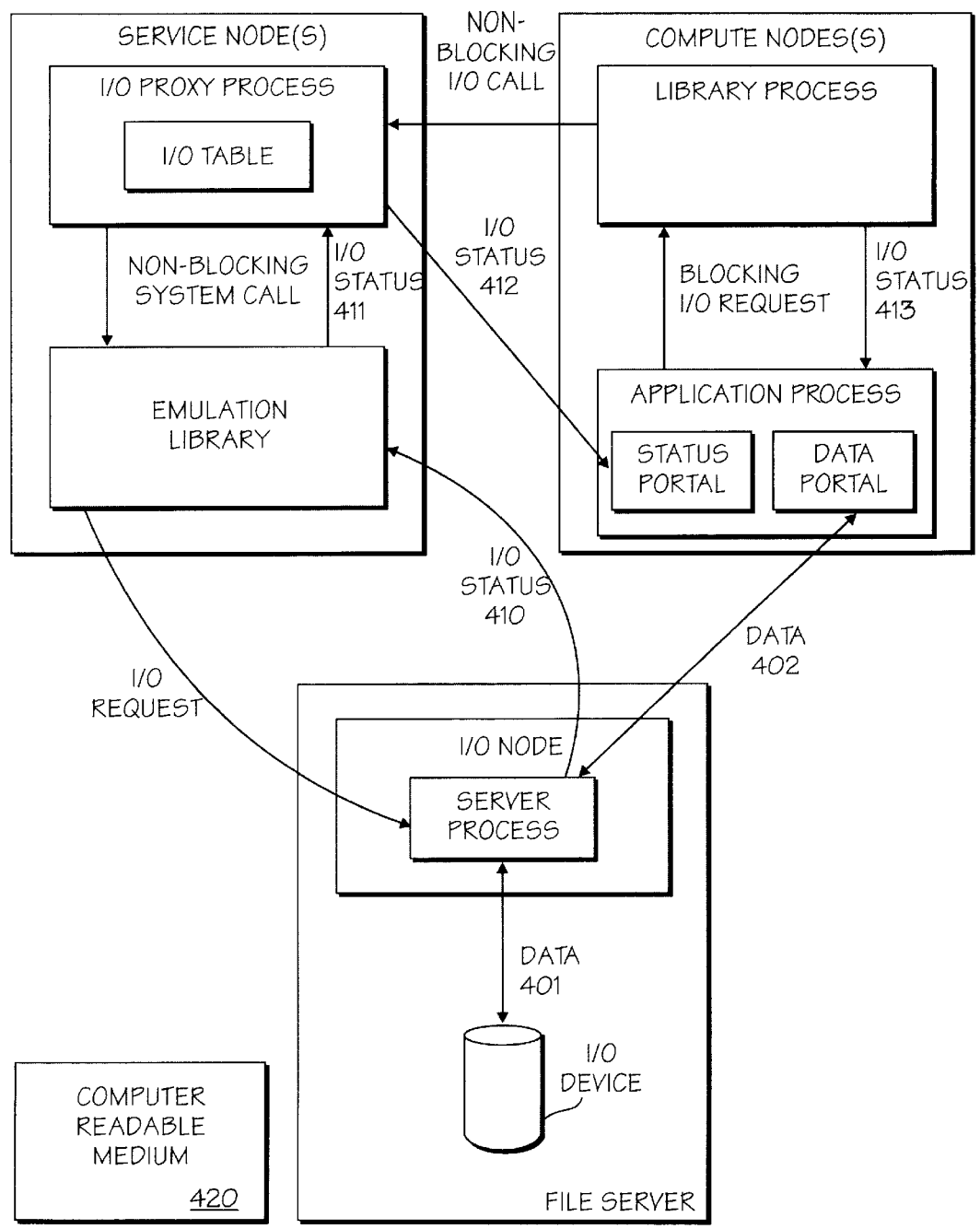
FIG. 4 illustrates another embodiment of a computer system of the present invention.

FIG. 4 illustrates one embodiment of a computer system of the present invention.

The computer system includes a set of compute nodes, a set of service nodes and a file server including an I/O node and an I/O device. Although a single I/O node and a single I/O device is shown, it will be apparent to one skilled in the art that the present invention may be practiced with multiple I/O nodes each having one or more I/O devices.

The I/O device(s) may include any device capable of transferring information to a local or a remote location. For example, the I/O device(s) may include a RAID, a hard disk drive, a compact disk read-only-memory (CD-ROM) drive, a floppy disk drive, a tape drive, a network device (capable of interfacing to a local area network, for example). In one embodiment, the I/O device is capable of reading and/or writing to a computer readable medium 420. The computer readable medium 420 may be a floppy disk, CD-ROM, or a tape cartridge, for example. The computer readable medium 420 may be a carrier wave such that information is contained in a signal that is superimposed on the carrier wave. In one embodiment, the computer readable medium 420 contains instructions, which when executed on a computer system performs an embodiment of a method described herein.

An application process and a library process are run on one or more of the compute nodes. An I/O proxy process and an emulation library are run on one or more of the service nodes. In one embodiment, one or more I/O proxy processes (in one or more sets of I/O proxy processes) are run on the set of service nodes. In one embodiment, at least some of these I/O proxy processes are dynamically created as described with reference to FIGS. 1 and 2. In another embodiment, one or more I/O proxy processes are statically generated.

Figure 5:
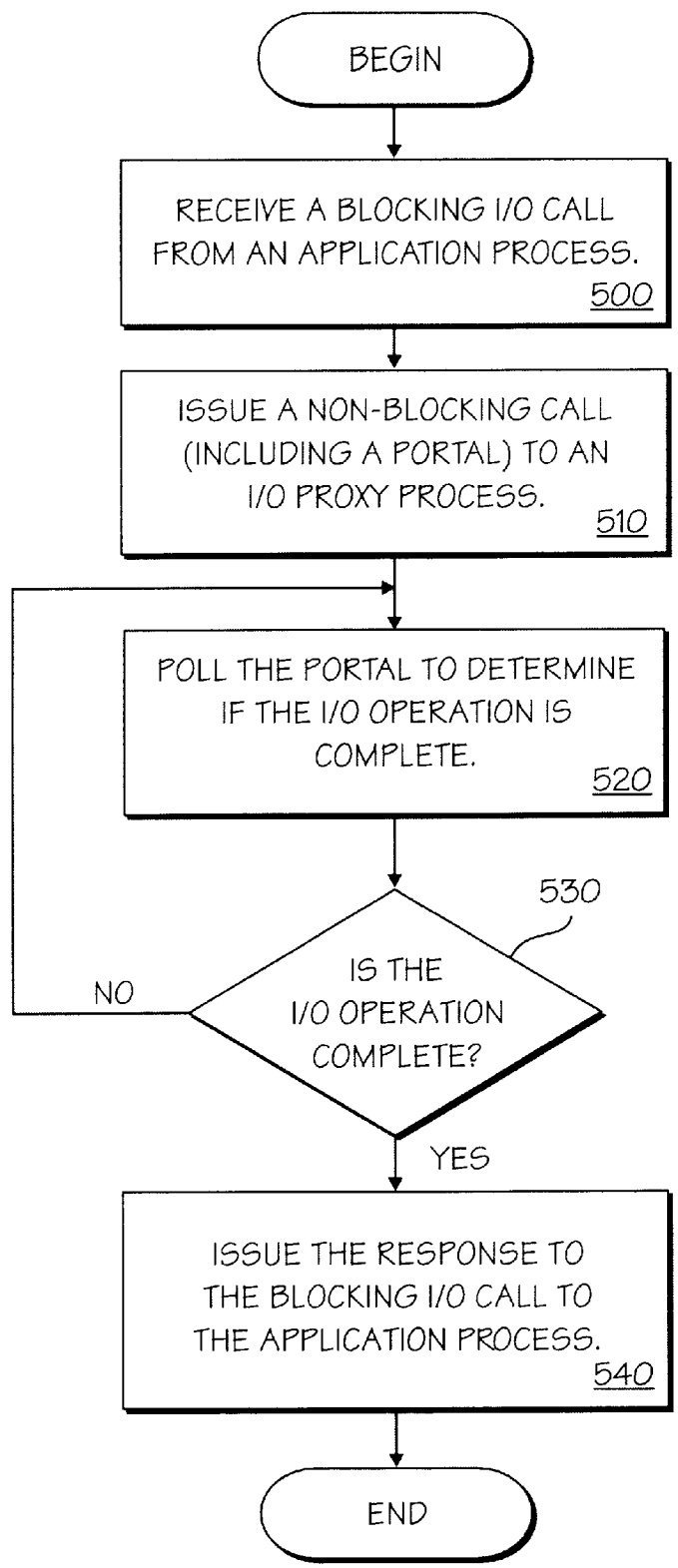
FIG. 5 illustrates one embodiment of the method of handling I/O requests in the computer system of FIG. 4.

FIG. 5 illustrates one embodiment of the method of handling I/O requests in a computer system. The method is described with reference to the computer system of FIG. 4. The computes nodes are running a library process and an application process. The service nodes are running at least one I/O proxy process and an emulation library. The I/O node is running a server process.

In step 500, the library process receives a blocking I/O call from the application process. A blocking I/O call typically halts availability of the receiving I/O proxy process to other I/O requests until the I/O request corresponding to the blocking I/O call is complete. For example, the application may issue a blocking I/O call known as iowait( ) to determine if a previous non-blocking I/O request, iwrite( ) has completed.

In step 510, the library process issues a non-blocking I/O call to the I/O proxy process. The non-blocking I/O call corresponds to the blocking I/O call and is issued with a portal that includes a pointer and a portal key. For example, the library process receives a blocking iowait( ) call and issues a non-blocking iodone( ) call. The non-blocking call includes a status portal. The status portal has a pointer to the application process and a portal key. In one embodiment, the status portal is managed by the operating system on the compute nodes in such a way that it is transparent to the library process and the application process.

In step 520, the library process polls the status portal to determine if the I/O operation is complete. Since the status portal is available locally, polling the status portal does not use bandwidth between the service nodes and the compute nodes. This leaves more bandwidth available to other operations leading to more efficient scalability of the I/O devices, such as the file server.

In step 530, the library process determines whether the I/O operation is complete. If the I/O operation is complete, the library process performs step 540. Otherwise, the library process performs step 520.

In step 540, the library process indicates to the application process that the I/O request is complete by sending the I/O status 413 to the application process. In one embodiment, the application process is blocked until it receives the I/O status and the translation of the blocking call to a non-blocking call by the library is transparent to the application process.

In one embodiment, the library process issues a blocking system call instead of performing steps 520 and 530. In one example, the library process receives a blocking I/O call, such as a cwrite( ) call, and issues a corresponding non-blocking I/O call, such as an iwrite( ) call, followed by a blocking I/O call, such as an iowait( ) call, to determine the status of the iwrite( ) call.

Figure 6:
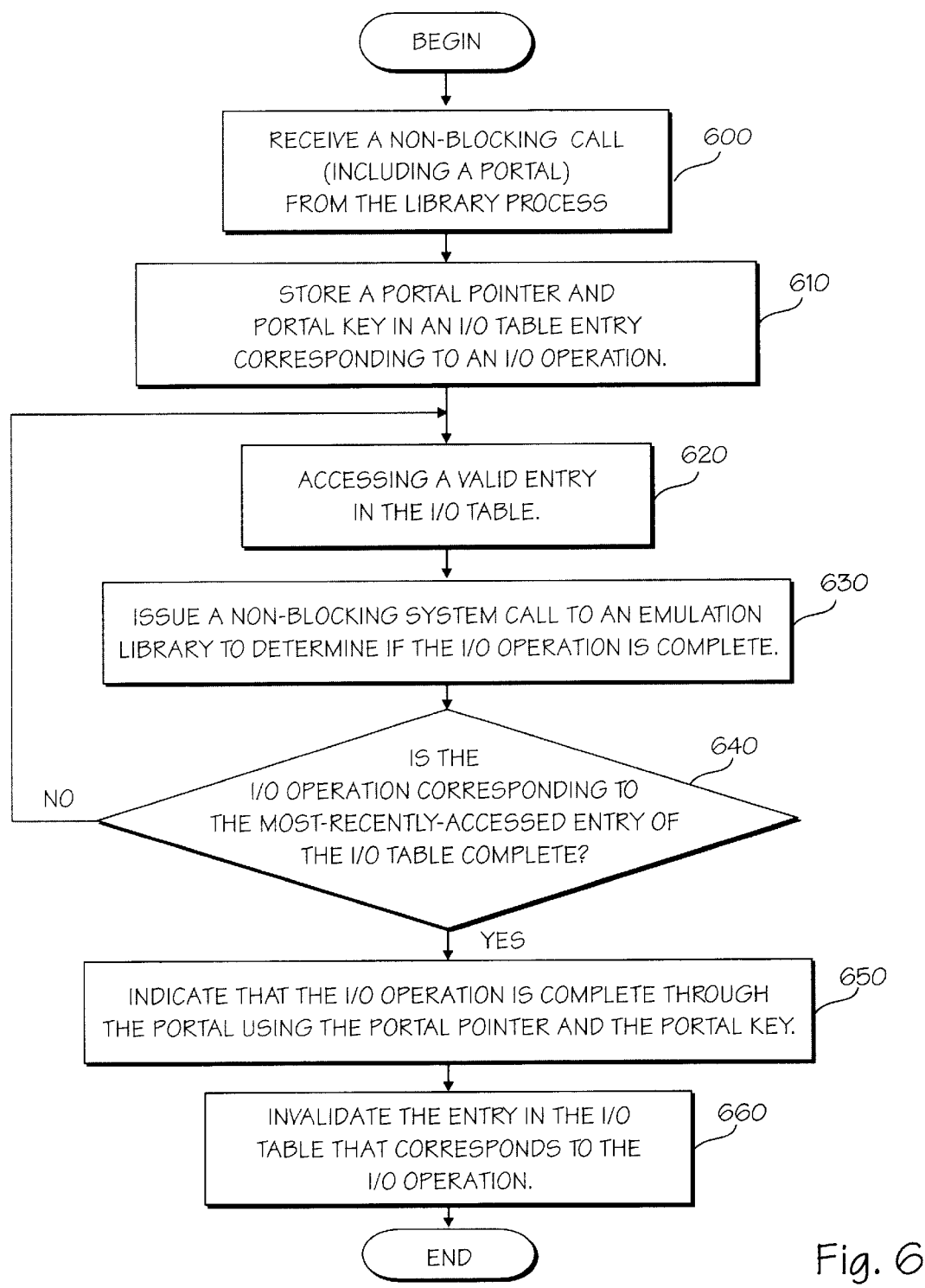
FIG. 6 illustrates one embodiment of the method of handling I/O requests in a computer system of FIG. 4.

FIG. 6 illustrates one embodiment of the method of handling I/O requests in a computer system. The method is described with reference to the computer system of FIG. 4. The computes nodes are running a library process and an application process. The service nodes are running at least one I/O proxy process and an emulation library. In one embodiment, the emulation library is dynamically linked to the I/O proxy process. The I/O node is running a server process.

In step 600, the I/O proxy process receives a non-blocking I/O call from the library process. The non-blocking call includes a portal pointer and a portal key for a status portal.

In step 610, the I/O proxy process stores the portal pointer and the portal key in an entry in an I/O table that stores pending (outstanding) I/O calls. The entry corresponds to an I/O operation.

In step 620, the I/O proxy process accesses a valid entry in the I/O table that corresponds to an outstanding non-blocking I/O call.

In step 630, the I/O proxy process issues a non-blocking system call to an emulator library. The non-blocking system call corresponds to the non-blocking I/O call. The emulation library polls the server process to determine if the I/O operation corresponding to that non-blocking I/O call is complete. The server process determines if the corresponding I/O operation has completed and returns an I/O status 410 to the emulation library.

In step 640, the I/O proxy process determines if the I/O operation is complete. If the I/O operation is complete, the I/O proxy process performs step 620. If the I/O operation is not complete, the I/O proxy process performs step 650.

In step 650, the I/O proxy process sends the I/O status 412 through the portal using the portal pointer and the portal key. The I/O status 412 indicates that the I/O operation corresponding to that non-blocking I/O call is complete.

In step 660, the I/O proxy process invalidates (or deletes) the entry of the I/O table that corresponds to the completed I/O request since it is no longer outstanding. The I/O proxy process then performs step 620.

In one embodiment, the I/O proxy process periodically accesses each valid entry in the I/O table such that it monitors all outstanding I/O operations. Thus, each time the I/O proxy process accesses the entry corresponding to a non-blocking I/O call in the I/O table, the I/O proxy process issues a non-blocking system call to the emulation library and receives an I/O status 411.

The I/O proxy process monitors the status of the outstanding I/O process by polling an emulation library that is local to the service nodes. This avoids communication cycles between the service nodes, the I/O node, and the compute nodes is used.

It will be apparent to one skilled in the art that the present invention may be practiced with multiple file servers. In one embodiment, the method and apparatus to dynamically create I/O proxy processes is used in conjunction with the method and apparatus to perform non-blocking I/O calls. Alternatively, these inventions may be practiced independently.

In one embodiment, data is transferred to the application process directly from the server process through a data portal. One example of such a file server is Intel's parallel file server (PFS). Alternatively, the data is transferred to the application process through I/O proxy process. This is typically how non-PFS file servers operate.

What is claimed is:

1. A method comprising:
   issuing a non-blocking system call to an I/O interface process, the non-blocking system call identifying a portal from an application process; and
   polling the portal to determine if an I/O request is complete, the I/O interface process:
   polling an I/O device in response to the non-blocking system call to determine if the I/O operation is complete; and
   indicating that the I/O operation is complete using the portal; wherein the step of polling an I/O device in response to the non-blocking system call comprises:
   storing a first entry corresponding to the I/O operation into a table, the table containing a plurality of entries each corresponding to one of a plurality of I/O operations;
   accessing the first entry; and
   determining whether the I/O operation corresponding to the first entry is complete.

2. The method of claim 1 wherein the first entry comprises a pointer to the portal.

3. The method of claim 1 wherein the first entry comprises a key corresponding to the portal, the key being used to access the portal.

4. The method of claim 1 wherein the I/O operation is a non-blocking write operation.

5. The method of claim 1 wherein the I/O operation is a non-blocking read operation.

6. A method comprising:
   receiving a blocking system call from an application process;
   issuing a non-blocking system call to an I/O interface process in response to receiving the blocking system call, the non-blocking system call identifying a portal from the application process;
   polling the portal to determine if an I/O request is complete; and
   indicating that the I/O request is complete to the application process when the step of polling the portal to determine if the I/O request is complete determines that the I/O request is complete, the I/O interface process:
   polling an I/O device in response to the non-blocking system call to determine if the I/O operation is complete; and
   indicating that the I/O operation is complete using the portal.

7. The method of claim 6 wherein the step of issuing a non-blocking system call to an I/O interface process in response to receiving the blocking system call is transparent to the application process.

8. A method comprising:
   receiving a blocking I/O operation;
   in response to receiving the blocking I/O operation:
   issuing the I/O operation, the I/O operation being a non-blocking I/O operation; and
   issuing a non-blocking I/O system call to an I/O interface process, the non-blocking system call identifying a portal from an application process; and
   polling the portal to determine if an I/O request is complete, the I/O interface process:
   polling an I/O device in response to the non-blocking system call to determine if the I/O operation is complete; and
   indicating that the I/O operation is complete using the portal.

9. The method of claim 8 wherein the blocking I/O operation is a blocking write operation and the I/O operation is a non-blocking write operation.

10. The method of claim 8 wherein the blocking I/O operation is a blocking read operation and the I/O operation is a non-blocking read operation.

11. A machine readable medium having embodied therein a program which when executed by a machine performs a method comprising of:
   issuing a non-blocking system call to an I/O interface process, the non-blocking system call identifying a portal from an application process; and
   polling the portal to determine if an I/O request is complete, the I/O interface process:
   polling an I/O device in response to the non-blocking system call to determine if the I/O operation is complete; and
   indicating that the I/O operation is complete using the portal; wherein the step of polling an I/O device in response to the non-blocking system call comprises:

storing a first entry corresponding to the I/O operation into a table, the table containing a plurality of entries each corresponding to one of a plurality of I/O operations;

accessing the first entry; and determining whether the I/O operation corresponding to the first entry is complete.

12. The machine readable medium of claim 11 wherein the first entry comprises a pointer to the portal.

13. The machine readable medium of claim 11 wherein the first entry comprises a key corresponding to the portal, the key being used to access the portal.

14. The machine readable medium of claim 11 wherein the I/O operation is a non-blocking write operation.

15. The machine readable medium of claim 11 wherein the I/O operation is a non-blocking read operation.

16. A machine readable medium having embodied therein a program which when executed by a machine performs a method comprising of:

receiving a blocking system call from an application process;

issuing a non-blocking system call to an I/O interface process in response to receiving the blocking system call, the non-blocking system call identifying a portal from the application process;

polling the portal to determine if an I/O request is complete; and indicating that the I/O request is complete to the application process when the step of polling the portal to determine if the I/O request is complete determines that the I/O request is complete, the I/O interface process:

polling an I/O device in response to the non-blocking system call to determine if the I/O operation is complete; and indicating that the I/O operation is complete using the portal.

17. The machine readable medium of claim 16 wherein the step of issuing a non-blocking system call to an I/O interface process in response to receiving the blocking system call is transparent to the application process.

18. A machine readable medium having embodied therein a program which when executed by a machine performs a method comprising of:

receiving a blocking I/O operation;

in response to receiving the blocking I/O operation:

issuing the I/O operation, the I/O operation being a non-blocking I/O operation; and issuing a non-blocking I/O system call to an I/O interface process, the non-blocking system call identifying a portal from an application process; and polling the portal to determine if an I/O request is complete, the I/O interface process:

polling an I/O device in response to the non-blocking system call to determine if the I/O operation is complete; and indicating that the I/O operation is complete using the portal.

19. The machine readable medium of claim 18 wherein the blocking I/O operation is a blocking write operation and the I/O operation is a non-blocking write operation.

20. The machine readable medium of claim 18 wherein the blocking I/O operation is a blocking read operation and the I/O operation is a non-blocking read operation.

* * * * *

UNITED STATES PATENT AND TRADEMARK OFFICE
CERTIFICATE OF CORRECTION

PATENT NO. : 6,161,152
DATED : December 12, 2000
INVENTOR(S) : Garg et al.

It is certified that error appears in the above-identified patent and that said Letters Patent is hereby corrected as shown below:

Column 9,
Line 11, delete "620" and insert -- 650 --.
Line 12, delete "650" and insert -- 620 --.

Signed and Sealed this

Seventeenth Day of September, 2002

Attest:

JAMES E. ROGAN
Attesting Officer   Director of the United States Patent and Trademark Office